United States Patent [19]
Viegas et al.

[11] Patent Number: 5,365,744
[45] Date of Patent: Nov. 22, 1994

[54] AIR CONDITIONING AND REFRIGERATION SYSTEMS UTILIZING A CRYOGEN

[75] Inventors: Herman H. Viegas, Bloomington, Minn.; Roland L. Roehrich, Pittsburgh, Pa.; Dale T. Johnson, Minneapolis, Minn.

[73] Assignee: Thermo King Corporation, Minneapolis, Minn.

[21] Appl. No.: 147,369

[22] Filed: Nov. 8, 1993

[51] Int. Cl.$^5$ ............................................. F17C 9/04
[52] U.S. Cl. ........................................ 62/50.3; 62/239
[58] Field of Search ................. 62/50.2, 50.3, 239

[56] References Cited

U.S. PATENT DOCUMENTS

| | | | |
|---|---|---|---|
| 3,802,212 | 4/1974 | Martin | 62/52 |
| 4,045,972 | 9/1977 | Tyree, Jr. | 62/156 |
| 4,100,759 | 7/1978 | Tyree, Jr. | 62/55 |
| 4,186,562 | 2/1980 | Tyree, Jr. | 62/62 |
| 4,498,306 | 2/1985 | Tyree, Jr. | 62/119 |
| 5,040,374 | 8/1991 | Micheau | 62/52.1 |
| 5,069,039 | 12/1991 | Martin | 62/50.3 |
| 5,090,209 | 2/1992 | Martin | 62/50.3 |
| 5,199,275 | 4/1993 | Martin | 62/275 |
| 5,259,198 | 11/1993 | Viegas et al. | 62/7 |
| 5,267,443 | 12/1993 | Roerich et al. | 62/50.3 |
| 5,267,446 | 12/1993 | Viegas et al. | 62/50.2 |
| 5,285,644 | 2/1994 | Roerich et al. | 62/50.3 |
| 5,287,705 | 2/1994 | Roerich et al. | 62/50.3 |
| 5,311,927 | 5/1994 | Taylor et al. | 165/64 |

*Primary Examiner*—William E. Tapolcai

[57] ABSTRACT

Air conditioning and refrigeration methods and apparatus for controlling the temperature of a conditioned space to a predetermined temperature band adjacent to a predetermined set point temperature via cooling and heating cycles utilizing a supply of pressurized cryogen. A fluid flow path for the cryogen includes a heat exchanger associated with the conditioned space. A cryogen heater is connected in the active cryogen flow path during a heating cycle, and cryogen is directed through the heater and heat exchanger via at least two successive serial passes, utilizing the elevated pressure energy of the cryogen as the motive force.

26 Claims, 5 Drawing Sheets

5,365,744

AIR CONDITIONING AND REFRIGERATION SYSTEMS UTILIZING A CRYOGEN

TECHNICAL FIELD

The invention relates in general to air conditioning and refrigeration systems, and more specifically to the use of a cryogen for controlling the temperature of a conditioned space of stationary and transport type applications of air conditioning and refrigeration systems.

BACKGROUND ART

Stationary and transport applications of air conditioning and transport refrigeration systems control the temperature of a conditioned space to a predetermined temperature range adjacent to a predetermined set point temperature, with transport applications including those used with straight trucks, tractor-trailer combinations, refrigerated containers, and the like. Such air conditioning and refrigeration systems conventionally utilize a chlorofluorocarbon (CFC) refrigerant in a mechanical refrigeration cycle. The mechanical refrigeration cycle requires a refrigerant compressor driven by a prime mover, which often includes an internal combustion engine, such as a diesel engine. Because of the suspected depleting effect of CFC's on stratospheric ozone ($O_3$), practical alternatives to the use of CFC's in air conditioning and refrigeration systems are being sought.

The use of a cryogen, i.e., a gas which has been compressed to a very cold liquid state, such as carbon dioxide ($CO_2$) and nitrogen ($N_2$), in air conditioning and refrigeration systems is particularly attractive because, in addition to eliminating the need for a CFC, it also eliminates the need for a compressor and associated prime mover.

Refrigeration systems of which we are aware which utilize a cryogen, implement a cooling cycle by circulating the cryogen through a fluid flow path, or flow paths, of a heat exchanger which is in heat exchange relation with air from the space to be conditioned. When a heating cycle is required to hold a set point temperature, or to implement a defrost cycle, the cryogen is heated by a burner connected to a combustible fuel, and the heated cryogen is circulated through the fluid flow path, or flow paths of the conditioned space heat exchanger. Thus, cryogen is expended during both the cooling and heating cycles.

It would be desirable, and it is an object of the invention, to provide new and improved cryogenic based air conditioning and refrigeration systems, suitable for both transport and stationary applications, which more effectively and efficiently utilizes the cryogen, for lower cost operation, and for extending the operating time in a transport application for a given on-board supply vessel of cryogen.

SUMMARY OF THE INVENTION

The invention includes a method of reducing the amount of cryogen consumed during a heating cycle of a refrigeration system which utilizes a supply of pressurized cryogen, including cryogen in a liquid state. The cryogen is circulated through an active cryogen flow path which includes heat exchanger means located to control the temperature of a conditioned space to a predetermined temperature band adjacent to a predetermined set point temperature via cooling and heating cycles. The heating cycle comprises the steps of heating the cryogen a first time, passing the heated cryogen through the heat exchanger means a first time, heating the cryogen a second time, after it has passed through the heat exchanger means, and passing the re-heated cryogen through the heat exchanger means a second time.

The invention also includes a refrigeration system for controlling the temperature of a conditioned space to a predetermined temperature band adjacent to a predetermined set point temperature via heating and cooling cycles, using a supply of pressurized cryogen which includes cryogen in a liquid state. A flow path for the cryogen includes heat exchanger means in the flow path associated with the conditioned space. Control means selectively configures the flow path to provide cooling and heating cycle flow paths, with heating means being in the heating cycle flow path. The heating means and the heat exchanger means each have at least first and second flow paths. The control means configures the active flow path during a heating cycle to successively direct cryogen in first and second passes through the heating means and the heat exchanger means via the first and second flow paths of the heating means and the first and second flow paths of the heat exchanger means.

The cryogen may be re-heated and passed through heat exchanger means as many times as practical, i.e., until the pressure energy in the cryogen is exhausted. Thus, a given refrigeration unit will include at least two, and possibly three, or more, passes through heating means and heat exchanger means during a heating cycle. The invention increases the amount of heating capability obtainable from a given volume of cryogen by heating the cryogen in multiple passes, followed by directing the heated cryogen through heat exchanger means.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Certain of the cryogenic based refrigeration concepts disclosed herein but not claimed, may have been disclosed and claimed in co-pending application Ser. Nos. 07/982,329; 07/982,333; 07/982,336; 07/982,364; 07/982,368; 07/982,370; 07/982,543; and 07/982,548, filed Nov. 27, 1992, and 08/017,905 filed Feb. 16, 1993.

As used in the following description and claims, the term "conditioned space" includes any space to be temperature and/or humidity controlled, including stationary and transport applications for the preservation of foods and other perishables, maintenance of a proper atmosphere for the shipment of industrial products, space conditioning for human comfort, and the like. The term "refrigeration system" is used to generically cover both air conditioning systems for human comfort, and refrigeration systems for preservation of perishables and shipment of industrial products. Also, when it is stated that the temperature of a conditioned space is controlled to a selected set point temperature, it is to be understood that the temperature of the conditioned space is controlled to a predetermined temperature band or range adjacent to the selected set point temperature. In the Figures, an arrow pointed at a valve indicates that the valve is, or may be, controlled by a thermostat temperature controller.

The invention is suitable for use when a refrigeration system is associated with a single conditioned space to be controlled to a selected set point temperature; and, the invention is also suitable for use when a refrigeration system is associated with a compartmentalized application, i.e., a conditioned space is divided into at least first and second separate conditioned spaces to be individually controlled to selected set point temperatures. In a compartmentalized application, for example, one conditioned space may be used to condition a frozen load, and the other a fresh load, or combinations thereof, as desired.

Figure 1:
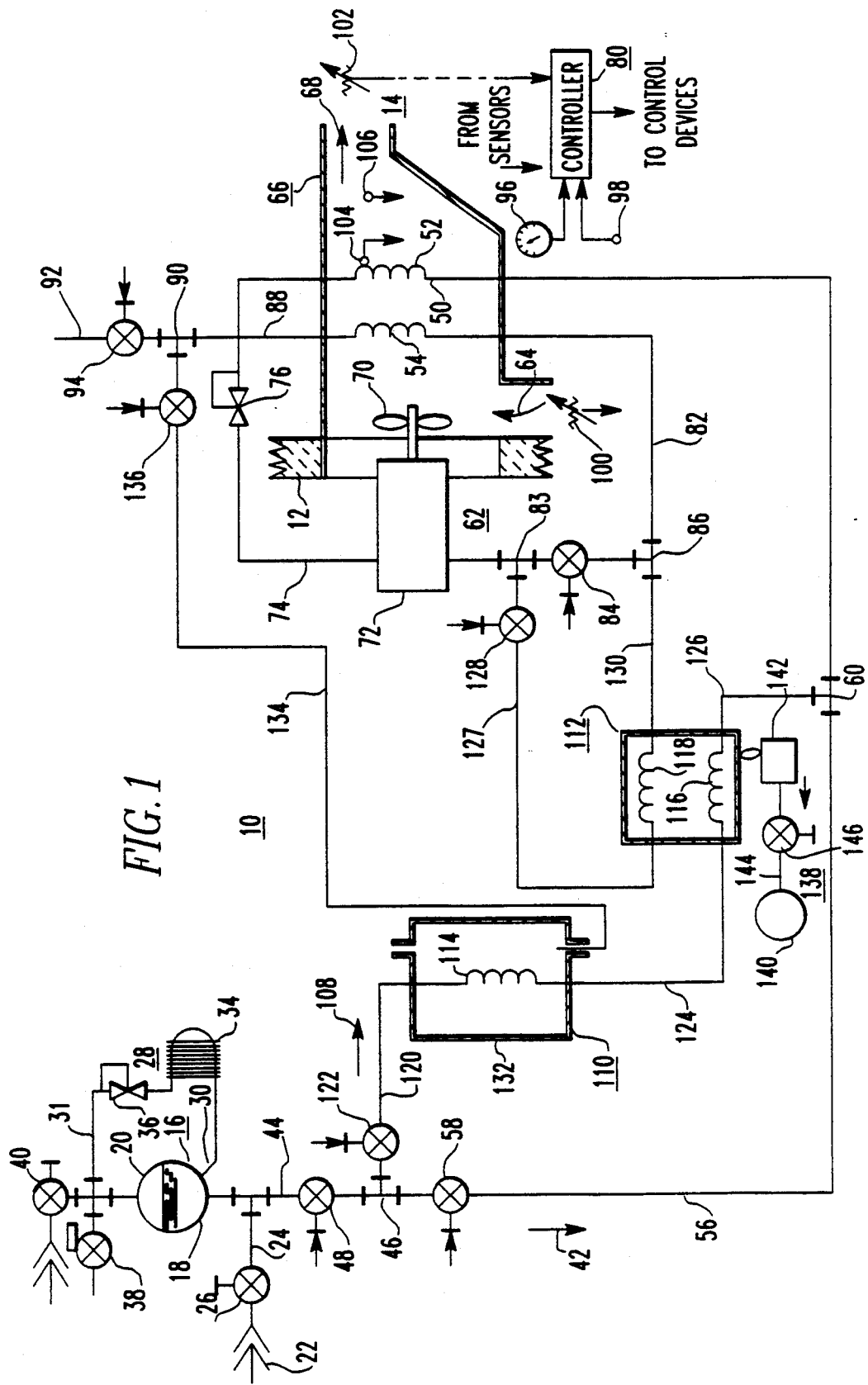
FIG. 1 is a diagrammatic representation of a refrigeration system constructed according to the teachings of a first embodiment of the invention.

Referring now to the drawings, and to FIG. 1 in particular, there is shown a refrigeration system 10 suitable for use with any conditioned space, and particularly well suited for use on straight trucks, tractor-trailer combinations, containers, and the like, with the word "vehicle" being used to generically refer to the various transport vehicles which utilize refrigeration systems.

Refrigeration system 10 may be used in stationary and transport applications, with reference 12 generally indicating a vehicle in a transport application, and an enclosure wall in a stationary application. Refrigeration system 10 may be used to condition a single conditioned space 14 to be conditioned to a predetermined set point temperature, and also to condition two or more separate conditioned spaces to selected set point temperatures. For purposes of example only, the embodiments of the invention set forth in the Figures illustrate refrigeration system 10 controlling the temperature of a single conditioned space 14.

More specifically, refrigeration system 10 includes a vessel 16 containing a suitable pressurized cryogen, such as nitrogen ($N_2$), or carbon dioxide ($CO_2$), for example, with a liquid phase thereof being indicated at 18, and with a vapor phase, located above the liquid level, being indicated at 20. Vessel 16 may be filled, for example, by connecting a ground support apparatus, indicated generally at 22, to a supply line or conduit 24 which includes a valve 26.

Vapor pressure in vessel 16 is maintained above a predetermined pressure by a pressure regulating arrangement 28 connected between lower and upper points of vessel 16 via conduits 30 and 31, respectively. When the cryogen used is $CO_2$, for example, the pressure in vessel 16 must be maintained above the triple point for $CO_2$, i.e., 75.13 psia. A vaporizing coil 34, and a pressure regulating valve 36 are connected between conduits 30 and 31. Pressure regulating valve 36 opens when the pressure in vessel 16 falls to a predetermined value, admitting liquid cryogen into vaporizing coil 34. Vaporizing coil 34 is exposed to ambient temperature outside of vehicle 12. Pressure regulating valve 36 maintains the vapor pressure in vessel 16 at a predetermined level selected for optimal system operation and/or to prevent the formation of $CO_2$ slush in vessel 16 when the cryogen is $CO_2$.

A pressure reading safety valve 38 is provided in conduit 31 at a point where the vapor pressure in vessel 16 may be directly sensed. A venting valve 40 is also provided to facilitate the vessel filling process. Using $CO_2$ as an example for the cryogen, vessel 16 may be filled with $CO_2$ at an initial pressure of about 100 psia and an initial temperature of about $-58°$ F. ($-50°$ C.). Of course, other pressures and temperatures may be used than in this example, such as an initial pressure of about 300 psia and an initial temperature of about $0°$ F. ($-17.8°$ C.).

A first cryogen fluid flow path 42 is provided which draws liquid cryogen 18 from vessel 16 via a conduit 44. Conduit 44 extends from a low point of vessel 16 to a tee 46, and conduit 44 may include a controllable valve 48. The first flow path 42 continues from a first flow branch of tee 46 to heat exchanger means 50. Heat exchanger means 50 includes at least first and second heat exchanger coils 52 and 54, respectively, with the first flow branch of tee 46 being connected to the inlet side of the first heat exchanger coil 52 via a conduit 56 which includes a controllable path selecting valve 58 and a tee 60. Valve 58, and other controllable valves in the Figures, are controlled by a thermostat temperature controller 80, hereinafter called controller 80.

The first flow path 42 continues from the outlet side of the first heat exchanger coil 52 to air mover means 62. Air mover means 62 draws air 64, called return air, from conditioned space 14 into an air conditioning means or apparatus 66, which includes the first and second heat exchanger coils 52 and 54. Conditioned air 68, called discharge air, is discharged back into conditioned space 14 by air mover means 62. Air mover means 62 includes a fan or blower 70 which is driven by vaporized cryogen in a suitable vapor driven motor or turbine 72, which will hereinafter be referred to as vapor driven motor 72.

The first heat exchanger coil 52 is dimensioned and configured, and the flow rate of the cryogen adjusted via controllable valve 48, or via controllable valve 58, to completely vaporize the liquid cryogen 18, and thus vaporized cryogen is provided at the outlet end of heat exchanger coil 52. The first flow path 42 continues from heat exchanger coil 52 to an input of vapor driven motor 72 via a conduit 74 which includes a back pressure regulating valve 76. Vapor driven motor 72 isentropically expands the vaporized cryogen, driving fan 70 while reducing the pressure and temperature of the cryogen.

An output of vapor driven motor 72 is connected to an inlet of the second heat exchanger coil 54 associated with air conditioning apparatus 66 via a conduit 82 which includes a tee 83, a controllable path selector valve 84, and a tee 86. The first cryogen flow path 42 then continues from an outlet of the second heat exchanger coil 54 via a conduit 88 which includes a tee 90. The first flow path 42 continues from a first branch of tee 90 to an exhaust conduit 92 which includes a controllable path selector valve 94. In a compartmentalized application, the second heat exchanger 54 may be associated with a second conditioned space having a set point temperature above the set point temperature of conditioned space 14, for example.

The first cryogen flow path 42 to this point of the description is used to provide a cooling cycle for conditioned space 14, when the temperature of conditioned space 14 is above a predetermined narrow temperature band relative to a set point temperature selected via a set point temperature selector 96. Flow regulating feed valve 48, or valve 58, is controlled by controller 80 as a function of system conditions at any instant. For example, flow regulating valves 48 or 58 may be controlled as a function of the desired set point temperature, the actual temperature of conditioned space 14, and the ambient temperature as sensed by an ambient air temperature sensor 98.

The temperature of conditioned space 14 is sensed by either, or both, return air and discharge air temperature sensors 100 and 102. Temperature sensor 100 senses the temperature of air 64 returning to the air conditioning apparatus 66. Temperature sensor 102 senses the temperature of air 68 being discharged from air conditioning apparatus 66. The conditioned air 68, which results from the heat exchange relation between the return air 64 and heat exchanger coils 52 and 54, is discharged back into conditioned space 14.

Air from conditioned space 14 does not mix with cryogen at any point in the refrigeration systems of the invention. Thus, there is never any contamination of conditioned space 14 with cryogen. Refrigeration system 10, however, may be used in combination with arrangements which do inject a cryogen, such as $CO_2$, into a conditioned space for fast temperature pull down and/or for load preservation. In such combined applications vessel 16 may be used as the source of the cryogen.

A temperature sensor 104 is disposed to sense the surface temperature of heat exchanger coil 52 at a location at or near the exit end of heat exchanger coil 52 to detect when evaporation may not be 100%, such as when surface ice builds up on heat exchanger coil 52. Thus, temperature sensor 104 may be used to enable controller 80 to trigger a heating cycle for defrosting heat exchanger coils 52 and 54. Other sensors may be used to sense when a heating cycle for defrost purposes is necessary, such as by disposing an air velocity sensor 106 in the discharge air path, with a velocity below a predetermined value indicating that water ice has reduced the air flow to a point where a heating cycle for defrost purposes is necessary.

Controller 80 subtracts the temperature of conditioned space 14, as indicated by the return air sensor 100, for example, from the set point temperature selected via set point selector 96, to provide a $\Delta T$ which is negative when the temperature of the conditioned space 14 is above set point, and positive when it is below set point. A negative $\Delta T$ triggers a cooling cycle, which results in controlling the flow of liquid cryogen 18 from vessel 16 through the first cryogen flow path 42 which includes the first and second heat exchanger coils 52 and 54.

A positive $\Delta T$ triggers a heating cycle, and, as just mentioned, a heating cycle may also be triggered by defrost sensing means, such as the coil temperature sensor 104, the air flow sensor 106, or a timer, to melt water ice which may build up on heat exchanger coils 52 and 54 during a cooling cycle. In the embodiment of FIG. 1, a heating cycle is implemented by a second cryogen flow path 108 which includes the hereinbefore described cryogen supply vessel 16, conduit 44, controllable valve 48, and a second branch of tee 46. When the second cryogen flow path 108 is the active flow path, controller 80 closes valve 58.

The second cryogen flow path 108 includes cryogen pre-heating means 110 and cryogen heating means 112. Cryogen pre-heating means 110 includes a pre-heat coil 114, such as an ambient loop exposed to ambient temperature. Cryogen heating means 112 includes at least first and second heater coils 116 and 118. A conduit 120, which includes a controllable path selecting valve 122, interconnects a branch of tee 46 to an inlet of pre-heat coil 114. Controller 80 opens valve 122 when the second cryogen flow path 108 is chosen as the active flow path. A conduit 124 interconnects an outlet of pre-heat coil 114 with an inlet of the first heater coil 116. A conduit 126 interconnects an outlet of the first heater coil 116 with a branch of tee 60.

The second cryogen flow path 108 then follows the first cryogen flow path 42 from tee 60, through the first heat exchanger coil 52 and vapor driven motor 72 to the tee 83. When the second cryogen flow path 108 is the active cryogen flow path, controller 80 closes valve 84. The second cryogen flow path 108 then follows a branch of tee 83 to an inlet of the second heater coil 118 via a conduit 127 which includes a controllable path selecting valve 128, which is opened by controller 80. An outlet of the second heater coil 118 is connected to the tee 86 via a conduit 130, and the second cryogen flow path 108 is in common with the first cryogen flow path 42 from tee 86 to tee 90. Controller 80 closes valve 94 when the second cryogen flow path is active, forcing the cryogen to flow from tee 90 to the cryogen pre-heating means 110.

For example, cryogen pre-heating means 110 may include a housing 132 about pre-heat coil 114, and cryogen from tee 90 may be introduced into housing 132 and into heat exchange relation with pre-heat coil 114 via a conduit 134. Conduit 134 includes a controllable path selecting valve 136, which is opened by controller 80 when the second cryogen flow path is selected as the active cryogen flow path. Thus, heat remaining in the expended cryogen is used to add heat to the pre-heat coil 114.

Cryogen heating means 112 includes means 138 for adding heat to the cryogen vaporized by pre-heating means 110, as the cryogen flows through the two passes through heating means 112 defined by the first and second heater coils 116 and 118. For example, means 138 may include a fuel supply 140 connected to a burner 142 via a conduit 144 which includes a controllable valve 146. The fuel from fuel supply 140, for example, may include liquefied natural gas, propane, diesel fuel, and the like. In a stationary application, other heat sources may be used to heat the cryogen, including electrical, hot liquids, steam, waste gases, and the like. When a heating cycle is required to achieve and hold the set point temperature, or to defrost heat exchanger coils 52 and 54, controller 80 opens valve 146, while simultaneously igniting burner 142. Heater coils 116 and 118 heat the cryogen to an elevated temperature, such as a temperature in the range of 500° F. to 600° F. (260° C. to 316° C.).

A controllable defrost damper (not shown) may be provided at the discharge outlet of air conditioning apparatus 66, with the defrost damper being closed during a defrost cycle, to prevent warm air from being discharged into conditioned space 14. Alternatively, vapor driven motor 72 may be by-passed during a defrost cycle by an appropriate controllable valve and piping arrangement.

The concept of the invention is to utilize pressure energy stored in the pressurized cryogen to "pump" heated cryogen through the multiple pass cryogen heating means 112 during a heating cycle to hold set point or to perform coil defrosting. After each pass through cryogen heating means 112 the vaporized cryogen is reheated and rerouted through a heat exchanger coil disposed in heat exchange relation with air from a space to be conditioned, e.g., through heat exchanger coils 52 and 54 which are in heat exchange relation with air from conditioned space 14. This looping through heater coils associated with cryogen heating means 112 and heat exchanger coils associated with air conditioning apparatus 66 is continued until the pressure energy in the cryogen is exhausted, i.e., until the pressure drops below a predetermined minimum pressure value, such as 18 to 20 psia, at which time the still warm cryogen is directed to pre-heating means 110. The main objective is to minimize the use of cryogen during a heating cycle.

For a predetermined refrigeration system 10 which starts with cryogen at a known elevated pressure, such as 100 psia, or 300 psia, it will be known how many loops or passes through heat exchanger means 112 and air conditioning means 66 are required to completely utilize the stored pressure energy. If the system 10 will use cryogens at different initial pressures, then the pressure of the cryogen may be sensed at the output of each, or certain, of the heat exchanger coils associated with air conditioning apparatus 66, and controller 80 can determine how many loops or passes are required and configure the active heating cycle cryogen flow path accordingly. A pressure sensing embodiment of the invention will be described relative to FIG. 3.

While the selection of one of two alternatively selectable cryogen flow paths is illustrated in FIG. 1, and the other Figures, by using a tee and two valves, it is to be understood that the tee and two valve configuration may be replaced by a single three-way valve. For example, in FIG. 1, tee 46 and valves 58 and 122; tee 83 and valves 84 and 128; and tee 90 and valves 94 and 136, may each be replaced by a three-way valve.

Figure 2:
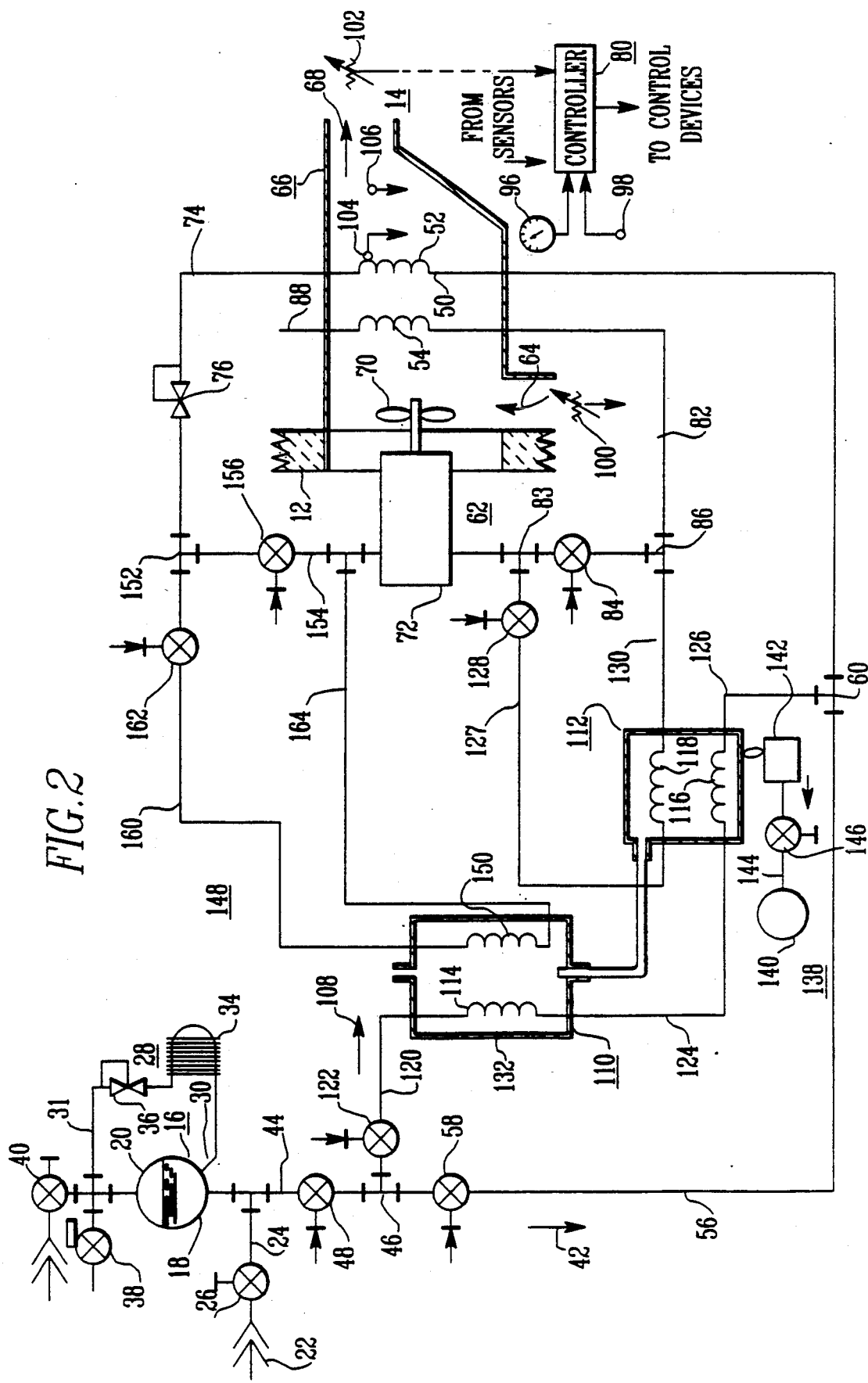
FIG. 2 is a diagrammatic representation of a refrigeration system constructed according to another embodiment of the invention.

FIG. 2 is a diagrammatic representation of a refrigeration system 148 which differs primarily from refrigeration system 10 in the manner in which additional heat is added to cryogen pre-heating means 110. Since the second cryogen flow path 108 and the cryogen pre-heating means 110 are modified, they are identified with reference numbers 108' and 110', respectively, in FIG. 2. The cooling cycle defined by the first cryogen flow path 42 is the same as in FIG. 1. Like components are identified with like reference numbers in all of the Figures and will not be described again.

More specifically, instead of using expended cryogen to add heat to pre-heating means 110', another pre-heat coil 150 is disposed within housing 132, and the outlet of the first heat exchanger coil 52 associated with air conditioning apparatus 66 is connected to a tee 152 via conduit 74, and the back pressure regulating valve 76. During a cooling cycle, tee 152 is connected to the inlet of vapor driven motor 72 via a conduit 154, a controllable path selecting valve 156, which is opened by controller 80, and a tee 158, and thus the first cryogen flow path 42 remains unchanged from the FIG. 1 embodiment.

During a heating cycle to hold set point, or to perform a defrosting function, tee 152 is connected to an inlet of pre-heat coil 150 via a conduit 160 which includes a controllable path selector valve 162 Controller 80 opens valve 162 and closes valve 156 during a heating cycle. The outlet of the second pre-heat coil 150 is connected to tee 158, and thus to the inlet of vapor driven motor 72, via a conduit 164. The remainder of the second cryogen flow path 108' is similar to that described relative to the FIG. 1 embodiment. The cryogen exiting heat exchanger coil 54 via conduit 88 may be directed to housing 132 of pre-heating means 110', as in the FIG. 1 embodiment, or exhausted, as desired.

FIG. 2 also illustrates another arrangement for adding additional heat to pre-heat coils 114 and 150, which arrangement may also be used in the FIG. 1 embodiment, if desired. A housing 166 is provided about heater coils 116 and 118 to collect hot gases which are formed as a by-product of combustion in heater 142, and these hot by-product gases are introduced into heat exchange relation with pre-heat coils 114 and 150 via a pipe or conduit 168 which enters pre-heater housing 132.

Figure 3:
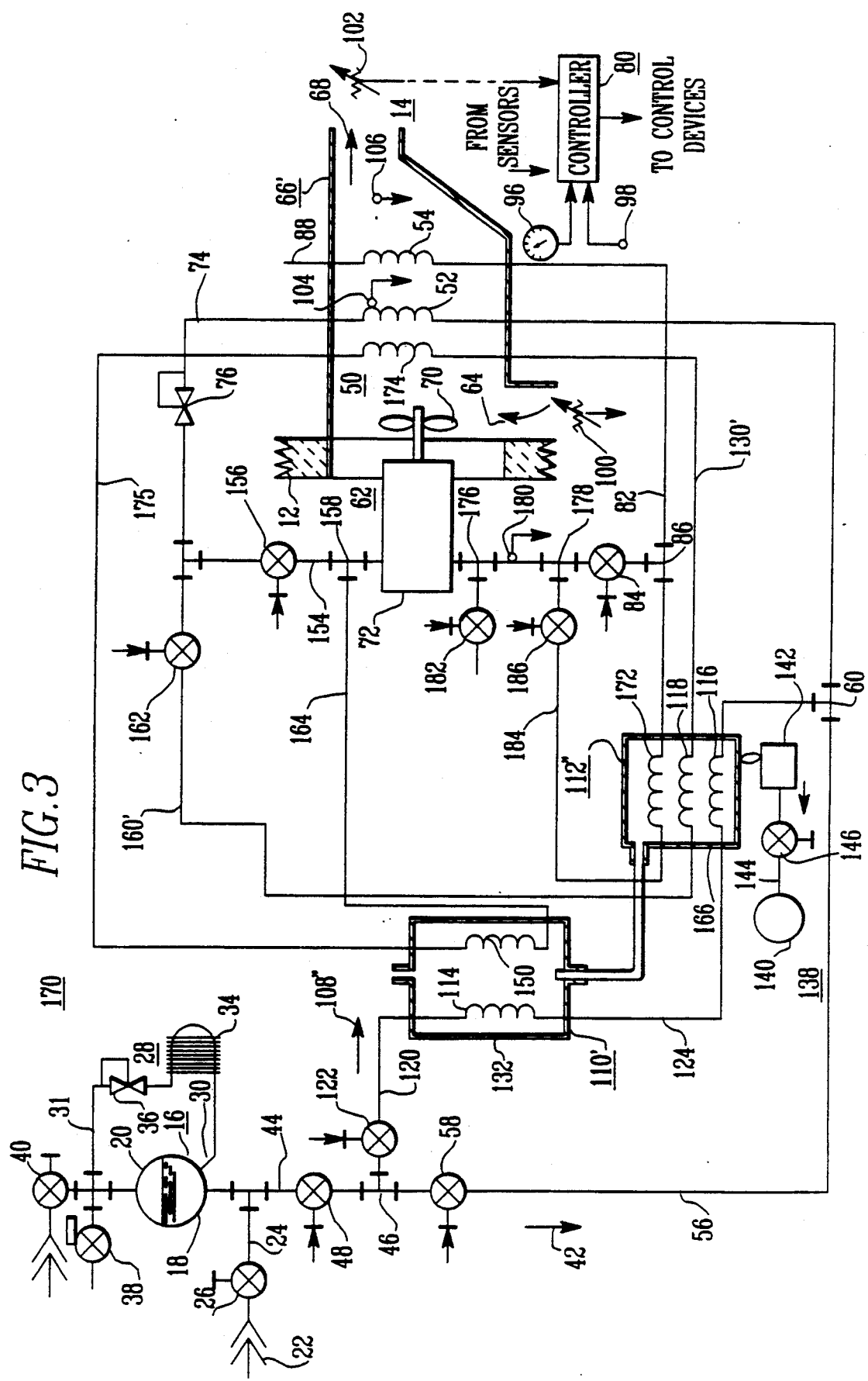
FIG. 3 is a diagrammatic representation of a refrigeration system constructed according to still another embodiment of the invention.

FIG. 3 is a diagrammatic representation of a refrigeration system 170 which differs from refrigeration systems 10 and 148 shown in FIGS. 1 and 2, respectively, by providing a dynamic number of passes or loops through cryogen heating means 112 and through air conditioning apparatus 66, identified with reference numbers 112" and 66' in FIG. 3 to indicate modifications thereto. A third heater coil 172 is added to heating means 112" and a third heat exchanger coil 174 is added to air conditioning apparatus 66'. The first cryogen flow path 42 is similar to that of the FIG. 1 and FIG. 2 embodiments, traversing heat exchanger coils 52 and 54. The second cryogen flow path 108" has been modified by changing the location of the vapor driven motor 72, and by providing an option of a third pass through cryogen heating means 112" and air conditioning apparatus 66'.

The second cryogen flow path 108" is the same as flow path 108' of FIG. 2 from tee 46 to tee 152, traversing pre-heat coil 114, heater coil 116 and the first heater coil 52. At tee 152 conduit 160, referenced 160' in FIG. 3, which conduit includes controllable valve 162, extends to the inlet of the second heater coil 118, instead of to pre-heat coil 150, as in the FIG. 2 embodiment. The outlet of the second heater coil 118 extends to an inlet of the additional heat exchanger coil 174 added to air conditioning apparatus 66', via a conduit 130', with the prime mark being added to indicate that conduit 130 proceeds to a different heat exchanger coil in FIG. 3 than in the FIG. 1 and FIG. 2 embodiments. The outlet of heat exchanger coil 174 extends to the inlet of pre-heat coil 150 via a conduit 175. The outlet of pre-heat coil 150 extends to tee 158 via conduit 164, and to the inlet of vapor driven motor 72, as in the FIG. 2 embodiment.

The outlet of vapor driven motor 72 is connected to conduit 82, which includes tees 176 and 178 and the controllable valve 84. A pressure sensor 180 is disposed to measure the pressure of the cryogen in conduit 82. If the pressure sensed by sensor 180 is below a predetermined minimum value, controller 80 may open a valve 182 connected to a branch of tee 176, to exhaust the expended cryogen; or, tee 176 and valve 182 may be eliminated, in which case controller 80 may open valve 84 and exhaust the cryogen through heat exchanger coil 54.

When pressure sensor 180 finds the pressure of the cryogen is above the predetermined value, controller 80 connects a branch of tee 178 to an inlet of the additional heater coil 172, via a conduit 184 and a controllable path selecting valve 186, which is opened by controller 80. An outlet of heater coil 172 is connected to tee 86, and tee 86 directs the cryogen, heated for the third time in cryogen heating means 112'', to the inlet of heat exchanger coil 54, for a third pass through air conditioning apparatus 66'.

Figure 4:
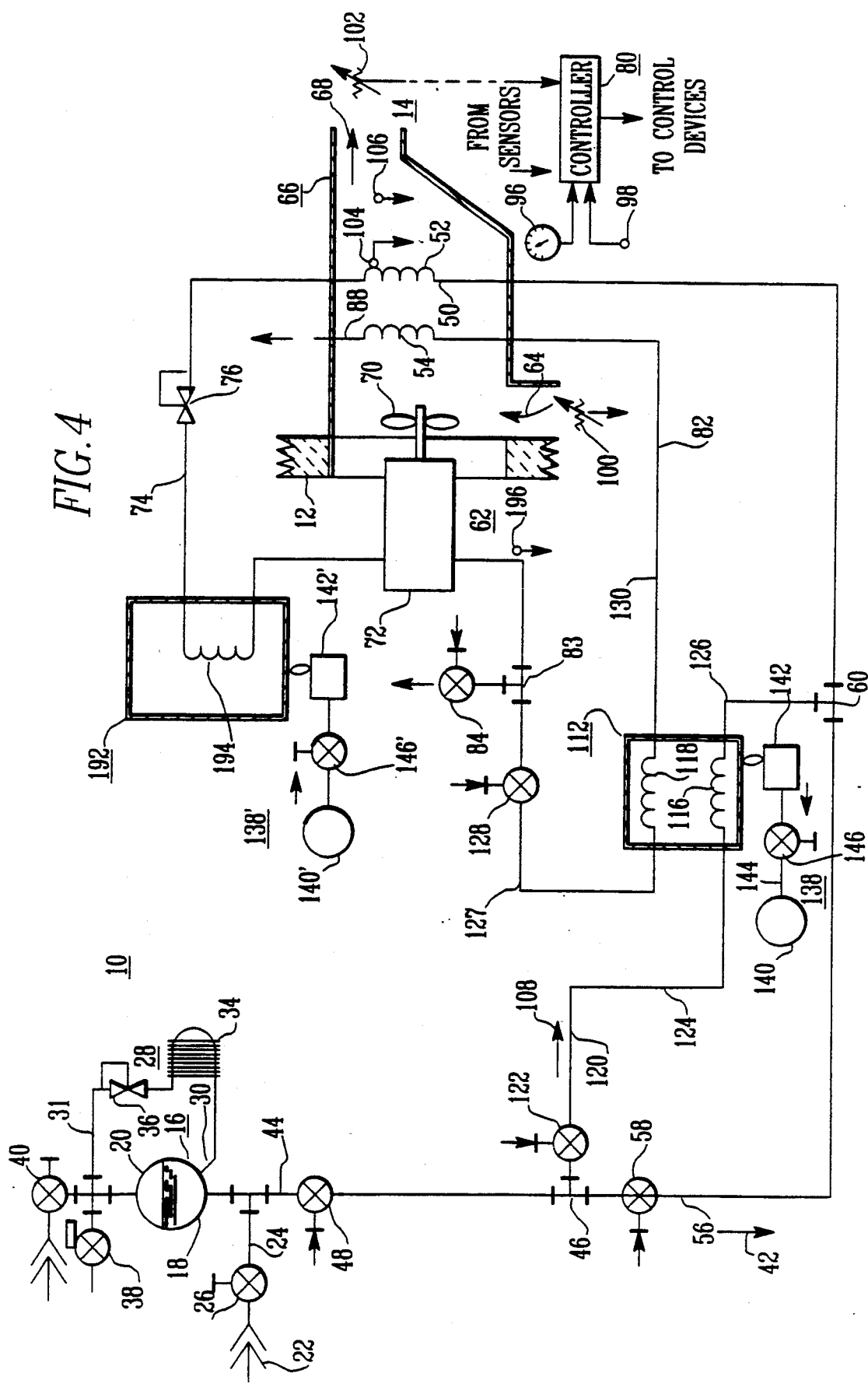
FIG. 4 is a diagrammatic representation of a refrigeration system constructed according to another embodiment of the invention.

FIG. 4 is a diagrammatic representation of a refrigeration system 190 constructed according to another embodiment of the invention which is particularly useful when the cryogen is liquid $CO_2$.

Refrigeration system 190 differs from the refrigeration system 10 shown in FIG. 1 by adding cryogen heating means 192 having a heater coil 194 connected in conduit 74, between back pressure regulating valve 76 and the input to vapor driven motor 72. Means 138' for adding heat to cryogen flowing through heater coil 194 is similar to the means 112 for adding heat to the heater coils 116 and 118. Instead of having two fuel supplies 140 and 140', a single fuel supply 140 may be used to provide fuel for both burners 142 and 142'. In addition to cryogen heating means 192, the tee 86 of FIG. 1 has been eliminated, with controllable valve 84, when opened, venting cryogen to the atmosphere. The optional cryogen pre-heating means 110 of FIG. 1, is not shown in FIG. 4, but may be used, if desired, with exhaust gases from any of the cryogen heating means being used to vaporize liquid $CO_2$.

During a cooling cycle, valve 58 would be opened by controller 80, to select the first cryogen flow path 42, while valve 122 would remain closed. Liquid cryogen would flow through the first heat exchanger coil 52, as metered by cryogen flow regulating valve 48, with the liquid cryogen evaporating in heat exchanger coil 52 due to heat in return air 64. The vaporized cryogen would then be directed through back pressure regulator 76 and heater coil 194. Valve 146' would normally be closed during a cooling cycle, but heating means 192 may be turned on during a cooling cycle by opening valve 146' and igniting burner 142', to prevent the formation of $CO_2$ "snow" in vapor driven motor 72. For example, heating means 192 may be turned on by controller 80 in response to a predetermined temperature of the vaporized cryogen entering heater coil 194, and/or ambient temperature. For example, heating means 192 may be turned on during a cooling cycle when the ambient temperature, as sensed by ambient air temperature sensor 98, is below some predetermined temperature, e.g., 45° F. (7.2° C.).

When the cryogen vapor exits vapor driven motor 72, controller 80 makes a decision, based upon the temperature of the cryogen vapor exiting vapor driven motor 72, and the set point temperature as indicated by set point temperature selector 96, whether to open valve 84, and exhaust the vaporized cryogen, or to open valve 128 and direct the cryogen through the second heat exchanger coil 54. If the temperature of the cryogen and the set point temperature are such that the cryogen will remove additional heat from the return air 64, valve 128 is opened. Otherwise, valve 84 is opened.

During a heating cycle to hold the set point temperature in conditioned space 14, or to defrost heat exchanger coils 52 and 54, controller 80 opens valve 122 to select the second cryogen flow path 108, and heating means 112 is turned on to vaporize and superheat the cryogen. Heating means 192 is primarily for "snow" prevention in vapor driven motor 72 during a cooling cycle, and would normally be off. However, heating means 192 may be turned on during a heating cycle, if desired, to add additional heat to the cryogen prior to entering vapor driven motor 72. Controller 80 also opens valve 128, to direct the cryogen exiting vapor driven motor 72 through heater coil 118, for a second pass through cryogen heating means 112. The re-heated cryogen is then directed through the second heat exchanger coil 54, and exhausted to the atmosphere through conduit 88.

Figure 4A:
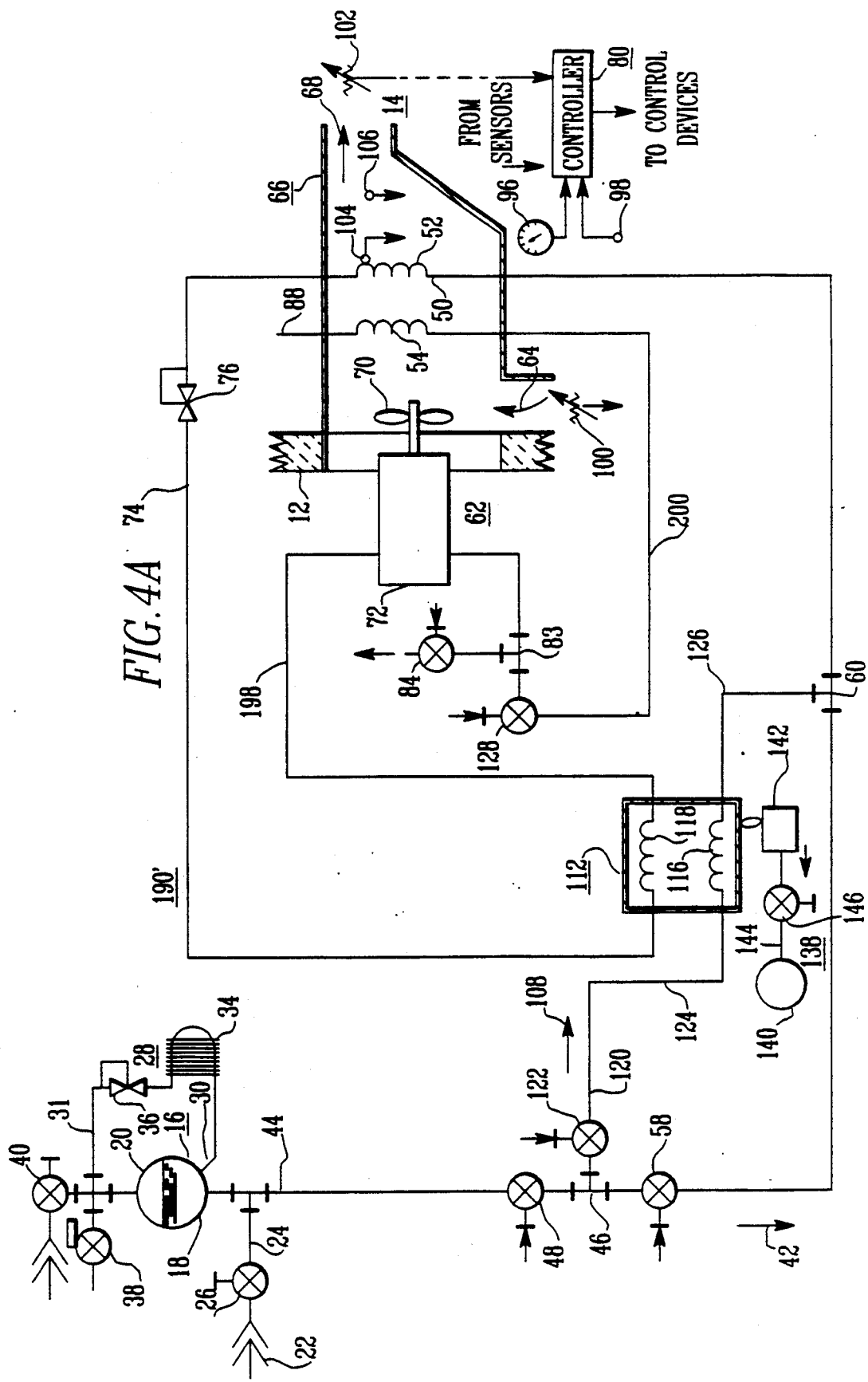
FIG. 4A is a diagrammatic representation of a refrigeration system which is a modification of the refrigeration system shown in FIG. 4.

While the arrangement shown in FIG. 4 is preferred in a system where "snow" prevention in motor 72 during a cooling cycle is desired, in certain refrigeration systems it would also be practical to eliminate cryogen heating means 192 and still provide "snow" prevention for vapor driven motor 72 during a cooling cycle. In this instance, as shown in FIG. 4A, the output of back pressure regulating valve 76 is connected directly into the input of the second heater coil 118 of cryogen heating means via conduit 74. The output of the second heater coil 118 is connected to the input of vapor driven motor 72 via a conduit 198. The output of controllable valve 128 is connected to the input of the second heat exchanger coil 54.

During a cooling cycle, valve 58 would be open and cryogen would flow through the first heat exchanger coil 52, back pressure regulator valve 76, the second heater coil 188, vapor driven motor 72, and either valve 84 or 128. When controller 80 selects valve 84, the cryogen vapor is discharged to the atmosphere, and when controller 80 selects valve 128, the vapor is directed through the second heat exchanger coil 54. Controller 80 makes a decision on whether or not valve 146 will be opened and burner 142 ignited during a cooling cycle, based upon the necessity of preventing the formation of $CO_2$ snow in vapor driven motor 72, as hereinbefore described relative to FIG. 4.

During a heating cycle, controller opens valves 122, 128, and 146, and ignites burner 142. The cryogen is thus heated in the first heater coil 116, passed through the first heat exchanger coil 52, re-heated in the second heater coil 118, passed through vapor driven motor 72, and then directed through the second heat exchanger coil 54. As hereinbefore stated, heating means 112 may have additional heater coils, and air conditioning apparatus 66 may have additional heat exchanger coils, to provide more than two passes through heating means 112 and apparatus 66, during a heating cycle, when the arrangement utilized still has usable pressure energy in the cryogen to support additional passes through heating means 112 and apparatus 66.

In summary, the invention reduces the amount of cryogen required to implement a heating cycle in a cryogen based refrigeration system, to hold a predetermined set point temperature in a conditioned space, or to initiate a defrost cycle of a frosted heat exchanger coil in air conditioning apparatus 66'. Pressure energy in the pressurized cryogen is utilized as the motive means for a plurality of passes through cryogen heating means 112'' and air conditioning apparatus 66', exhausting the heated cryogen only when the pressure energy is too low to perform another efficient pass. Even then, the expended cryogen may still be used to add heat to the cryogen pre-heating means 110, if desired, as illustrated in the FIG. 1 embodiment.

We claim:

1. A method of reducing the amount of cryogen consumed during a heating cycle of a refrigeration system which utilizes a supply of pressurized cryogen, which includes cryogen in a liquid state, with the cryogen being circulated through a cryogen flow path which includes heat exchanger means located to control the temperature of a conditioned space to a predetermined temperature band adjacent to a predetermined set point temperature via cooling and heating cycles, the heating cycle comprising the steps of:

heating the cryogen a first time, passing the heated cryogen through the heat exchanger means a first time, heating the cryogen a second time, after it has passed through the heat exchanger means, and passing the re-heated cryogen through the heat exchanger means a second time.

2. The method of claim 1 including the steps of determining the pressure of the re-heated cryogen, after the re-heated cryogen has passed through the heat exchanger means a second time, comparing the pressure of the cryogen with a predetermined minimum value necessary for efficient re-use of the cryogen in the heating cycle, heating the cryogen a third time when the comparison step finds the pressure sufficient for re-use, and passing the re-heated cryogen through the heat exchanger means.

3. The method of claim 1 including the step of pre-heating the liquid cryogen to cause vaporization, with the step of heating the cryogen the first time heating cryogen vaporized by the pre-heating step.

4. The method of claim 3 wherein the step of pre-heating liquid cryogen includes the step of directing heated cryogen exiting the heat exchanger means in heat exchange relation with the liquid cryogen.

5. The method of claim 4 wherein the directing step directs heated cryogen from the heat exchanger means after the step of passing heated cryogen through the heat exchanger means the first time, and prior to the step of passing heated cryogen through the heat exchanger means the second time.

6. The method of claim 4 wherein the directing step directs heated cryogen from the heat exchanger means after the step of passing heated cryogen through the heat exchanger means for the second time.

7. The method of claim 4 including the steps of:

moving air from the conditioned space in heat exchange relation with the heat exchanger means, and providing motor means in the cryogen flow path driven by vaporized cryogen to implement the step of moving air from the conditioned space in heat exchange relation with the heat exchanger means, with the step of using heated cryogen to aid the pre-heating step including the step of using cryogen in the active flow path located downstream from the vapor driven motor means.

8. The method of claim 4 including the steps of:

moving air from the conditioned space in heat exchange relation with the heat exchanger means, and providing motor means in the cryogen flow path driven by vaporized cryogen to implement the step of moving air from the conditioned space in heat exchange relation with the heat exchanger means, with the step of using heated cryogen to aid the pre-heating step including the step of using cryogen in the active flow path located upstream from the vapor driven motor means.

9. The method of claim 3 wherein the steps of heating the cryogen the first and second times includes the step of generating heated gases as a by-product, and the step of pre-heating liquid cryogen includes the step of directing the heated gases generated by the heating step in heat exchange relation with the liquid cryogen.

10. The method of claim 1 wherein the cryogen is $CO_2$, and including the steps of:

providing a cooling cycle, moving air from the conditioned space in heat exchange relation with the heat exchanger means, providing motor means in the cryogen flow path driven by vaporized cryogen to implement the step of moving air from the conditioned space in heat exchange relation with the heat exchanger means, detecting when prevention of $CO_2$ snow in the motor means is desirable during a cooling cycle, and heating the cryogen upstream from the motor means when the detecting step detects the need to prevent $CO_2$ snow in the motor means.

11. A method for controlling the temperature of a conditioned space comprising the steps of:

providing a pressurized supply of cryogen which includes cryogen in a liquid state, providing a fluid flow path for the cryogen, providing heat exchanger means in the flow path, providing a cooling cycle by passing cryogen through the heat exchanger means, and providing a heating cycle by the steps of heating the cryogen in response to a predetermined condition, passing the heated cryogen through the heat exchanger means, and repeating the steps of heating the cryogen and passing the heated cryogen through the heat exchanger means until the pressure of the cryogen falls below a predetermined value.

12. The method of claim 11 wherein the step of providing a heating cycle further includes the step of pre-heating liquid cryogen prior to the heating step.

13. The method of claim 12 wherein the step of pre-heating liquid cryogen includes the step of using cryogen heated by a heating step to add heat to the liquid cryogen.

14. The method of claim 12 wherein the steps of heating the cryogen the first and second times includes the step of generating heated gases as a by-product, and the step of pre-heating liquid cryogen includes the step of using the heated gases to add heat to the liquid cryogen.

15. The method of claim 11 wherein the cryogen is $CO_2$, and including the steps of:

moving air from the conditioned space in heat exchange relation with the heat exchanger means, providing motor means in the cryogen flow path driven by vaporized cryogen to implement the step of moving air from the conditioned space in heat exchange relation with the heat exchanger means, detecting when prevention of $CO_2$ snow in the motor means is desirable during a cooling cycle, and heating the cryogen upstream from the motor means when the detecting step detects the need to prevent $CO_2$ snow in the motor means.

16. A refrigeration system for controlling the temperature of a conditioned space to a predetermined temperature band adjacent to a predetermined set point temperature via heating and cooling cycles, including a supply of pressurized cryogen which includes cryogen in a liquid state, a flow path for the cryogen, heat exchanger means in the cryogen flow path associated with the conditioned space, control means for selectively configuring the cryogen flow path to provide cooling and heating cycle cryogen flow paths, and cryogen heating means in the heating cycle cryogen flow path, the improvement comprising:

said heating means and said heat exchanger means each having at least first and second cryogen flow paths, said control means configuring the cryogen flow path during a heating cycle to successively direct cryogen in first and second passes through the cryogen heating means and the heat exchanger means via the first and second cryogen flow paths of the heating means and the first and second cryogen flow paths of the heat exchanger means.

17. The refrigeration system of claim 16 wherein the heating means and the heat exchanger means each have a third cryogen flow path, and wherein the control means configures the cryogen flow path during a heating cycle to direct cryogen in a third pass through the cryogen heating means and the heat exchanger means via the third cryogen flow paths of the cryogen heating means and heat exchanger means.

18. The refrigeration system of claim 16 including cryogen pre-heating means, and means connecting said cryogen pre-heating means in the cryogen flow path during a heating cycle prior to the cryogen heating means, for vaporizing liquid cryogen.

19. The refrigeration system of claim 18 including means directing cryogen heated by the cryogen heating means in heat exchange relation with cryogen flowing through the cryogen pre-heating means, to aid the cryogen pre-heating means in adding heat to the cryogen.

20. The refrigeration system of claim 19 wherein the means which directs heated cryogen to aid the cryogen pre-heating means, directs cryogen from a point in the heating cycle cryogen flow path located downstream from the heat exchanger means.

21. The refrigeration system of claim 19 wherein the means which directs heated cryogen to aid the cryogen pre-heating means, directs cryogen from a point in the heating cycle cryogen flow path located between the first and second passes through the heat exchanger means.

22. The refrigeration system of claim 19 wherein the means which directs heated cryogen to aid the cryogen pre-heating means, directs cryogen from a point in the heating cycle cryogen flow path located after the second pass through the heat exchanger means.

23. The refrigeration system of claim 16 wherein the cryogen heating means generates heated gases as a by-product, and including cryogen pre-heating means in the heating cycle cryogen flow path for heating liquid cryogen at a point upstream from the cryogen heating means, said cryogen pre-heating means including means directing heated gases generated by the cryogen heating step in heat exchange relation with the cryogen flowing through the cryogen pre-heating means.

24. The refrigeration system of claim 16 including means for moving air from the conditioned space in heat exchange relation with the heat exchanger means associated with the conditioned space, with the air moving means including vapor driven motor means in the cryogen flow path located downstream from the second cryogen flow path through the heat exchanger means.

25. The refrigeration system of claim 16 including means for moving air from the conditioned space in heat exchange relation with the heat exchanger means associated with the conditioned space, with the air moving means including vapor driven motor means in the cryogen flow path located between the first and second cryogen flow paths of the heat exchanger means.

26. The refrigeration system of claim 16 wherein the cryogen is $CO_2$, and including:

air mover means moving air from the conditioned space in heat exchange relation with the heat exchanger means, said air mover means including vapor driven motor means in a cryogen flow path during both cooling and heating cycles, means detecting when prevention of $CO_2$ snow in the vapor driven motor means is desirable during a cooling cycle, and heating means disposed in the cooling cycle cryogen flow path upstream from the motor means, said heating means heating the cryogen when the detecting means detects the need to prevent $CO_2$ snow in the motor means.

* * * * *